United States Patent
Fritzley et al.

(10) Patent No.: US 8,448,085 B2
(45) Date of Patent: May 21, 2013

(54) PORTABLE ELECTRONIC DEVICE AND METHOD OF CONTROLLING SAME FOR RENDERING CALENDAR INFORMATION

(75) Inventors: Eric Allan Fritzley, Waterloo (CA); Adrian Michael Logan, Milton (CA); Dariusz Zajac, Kitchener (CA)

(73) Assignee: Research In Motion Limited, Waterloo (CA)

(*) Notice: Subject to any disclaimer, the term of this patent is extended or adjusted under 35 U.S.C. 154(b) by 247 days.

(21) Appl. No.: 12/870,162

(22) Filed: Aug. 27, 2010

(65) Prior Publication Data

US 2011/0202861 A1 Aug. 18, 2011

Related U.S. Application Data

(60) Provisional application No. 61/304,706, filed on Feb. 15, 2010.

(51) Int. Cl.
*G06F 3/048* (2006.01)

(52) U.S. Cl.
USPC ............ 715/784; 715/783; 715/771; 715/779

(58) Field of Classification Search .................. 715/771, 715/779, 783, 821
See application file for complete search history.

(56) References Cited

U.S. PATENT DOCUMENTS

| | | | | |
|---|---|---|---|---|
| 7,111,251 B2* | 9/2006 | Komai | ........................... | 715/844 |
| 7,729,729 B2* | 6/2010 | Chon | ........................... | 455/566 |
| 2003/0050753 A1* | 3/2003 | Ihara et al. | .................... | 701/208 |
| 2003/0206197 A1 | 11/2003 | McInerney | | |
| 2005/0113145 A1* | 5/2005 | Chon | ........................... | 455/566 |
| 2005/0132299 A1* | 6/2005 | Jones et al. | .................... | 715/759 |
| 2005/0228814 A1* | 10/2005 | Plow et al. | .................... | 707/102 |
| 2005/0267975 A1* | 12/2005 | Qureshi et al. | ................ | 709/229 |
| 2006/0136835 A1* | 6/2006 | Hochmuth et al. | ........... | 715/779 |
| 2007/0089071 A1* | 4/2007 | Zinn et al. | ..................... | 715/844 |
| 2007/0260503 A1* | 11/2007 | Pan et al. | ........................... | 705/9 |
| 2008/0165151 A1* | 7/2008 | Lemay et al. | ................. | 345/173 |
| 2008/0209546 A1* | 8/2008 | Kim | ............................... | 726/19 |

(Continued)

FOREIGN PATENT DOCUMENTS

WO 2007/131316 A1 11/2007

OTHER PUBLICATIONS http://www.telerik.com/community/forums/silverlight/scheduler/scrollbar-on-the-day-view-s-all-day-area.aspx, published at least as early as Feb. 11, 2010, 3 pages.

(Continued)

*Primary Examiner* — Daeho Song
(74) *Attorney, Agent, or Firm* — Richard A. Johnson; Borden Ladner Gervais LLP

(57) ABSTRACT

A method includes rendering a representation of a day in a calendar day view on a display of an electronic device, retrieving calendar event records that satisfy constraints, identifying a first all-day event record and a second all-day event record of the calendar event records, and in response to identifying the first all-day event record and the second all-day event record, maintaining display of an all-day event indicator in the day view during scrolling within the representation of the day by alternately displaying an indicator of the first all-day event record and an indicator of the second all-day event record.

17 Claims, 8 Drawing Sheets

U.S. PATENT DOCUMENTS

| | | | | |
|---|---|---|---|---|
| 2008/0235571 A1* | 9/2008 | Mizumukai | ............ | 715/231 |
| 2008/0320389 A1* | 12/2008 | Tanaka et al. | ............ | 715/700 |
| 2010/0203908 A1* | 8/2010 | Jeong et al. | ............ | 455/466 |
| 2011/0167369 A1* | 7/2011 | van Os | ............ | 715/769 |
| 2011/0173221 A1* | 7/2011 | Ahiakpor et al. | ............ | 707/769 |

OTHER PUBLICATIONS http://www.sky.com/portal/site/skycom/skyhelpcentre/skyonline?nodeId=faea4319-a810-4d8e-8c0b-ffb6033bb1fe&articleId=11296303, published at least as early as Feb. 11, 2010, 1 page.

http://www.anandtech.com/gadgets/showdoc.aspx?i=3027&p=22, published at least as early as Feb. 11, 2010, 6 pages.

http://tech.kateva.org/2008/08/iphone-calendar-design-flaw-all-day.html, published at least as early as Feb. 11, 2010, 5 pages.

http://justanothermobilemonday.com/Wordpress/2007/07/29/the-web-is-pocket-informant-review/, Feb. 11, 2010, 43 pages.

http://palmdiscovery.com/2005/10/17/why-get-a-palm-pt-3-palm-is-a-better-organizer/, Feb. 11, 2010, 15 pages.

http://www.ucop.edu/irc/announce/tipnotes_outlook.html, Feb. 11, 2010, 2 pages.

http://www.telerik.com/help/wpf/radscheduler-visual-structure-views.html, Feb. 11, 2010, 4 pages.

Extended European Search Report dated Jun. 1, 2012, issued from the corresponding EP patent application No. 10174427.4.

* cited by examiner

PORTABLE ELECTRONIC DEVICE AND METHOD OF CONTROLLING SAME FOR RENDERING CALENDAR INFORMATION

CROSS-REFERENCE TO RELATED APPLICATIONS

This application claims the benefit of U.S. Provisional Patent Application 61/304,706, filed Feb. 15, 2010, the entire content of which is incorporated herein by reference.

FIELD OF TECHNOLOGY

The present disclosure relates to electronic devices, including but not limited to, portable electronic devices having touch-sensitive input devices and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. The information displayed on a small device is limited by the size of the display. With continued demand for decreased size of portable electronic devices, displays continue to decrease in size.

Improvements in electronic devices are desirable.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment and in which.

DETAILED DESCRIPTION

Figure 1:
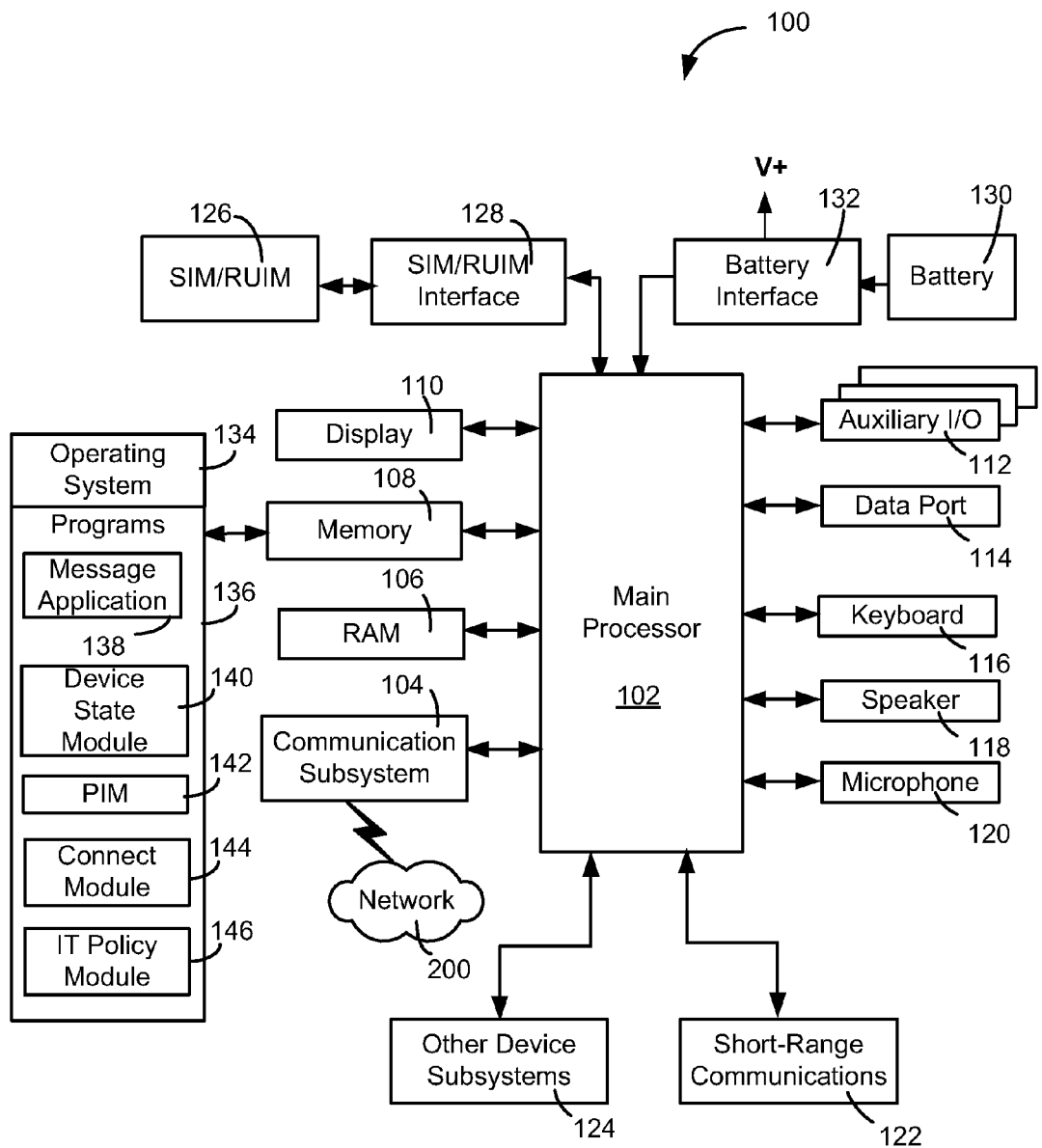
FIG. 1 is a block diagram of an example of an embodiment of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable wireless communication device, hereafter referred to as a portable electronic device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The portable electronic device is a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). To aid the reader in understanding the structure of the portable electronic device and how it communicates with other devices and host systems, reference will now be made to FIGS. 1 through 4.

Referring first to FIG. 1, shown therein is a block diagram of an exemplary embodiment of a portable electronic device 100. The portable electronic device 100 includes a number of components such as a main processor 102 that controls the overall operation of the portable electronic device 100. Communication functions, including data and voice communications, are performed through a communication subsystem 104. The communication subsystem 104 receives messages from and sends messages to a wireless network 200. In this exemplary embodiment of the portable electronic device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with portable electronic device 100 is a GSM/GPRS wireless network in one exemplary implementation, other wireless networks may also be associated with the portable electronic device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, an optical joystick 117, a speaker 118, a microphone 120, short-range communications 122 and other device subsystems 124.

Some of the subsystems of the portable electronic device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The portable electronic device 100 can send and receive communication signals over the wireless network 200 after required network registration or activation procedures have been completed. Network access is associated with a subscriber or user of the portable electronic device 100. To identify a subscriber, the portable electronic device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the portable electronic device 100 and to personalize the portable electronic device 100, among other things. Without the SIM card 126, the portable electronic device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical portable electronic device. The SIM card/RUIM 126 may store additional subscriber information for a portable electronic device as well, including datebook (or calendar) information and recent call information. Alternatively, user identification information can also be programmed into the flash memory 108.

The portable electronic device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the portable electronic device 100. Although current technology makes use of a battery, future technologies such as micro fuel cells may provide the power to the portable electronic device 100.

The portable electronic device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the portable electronic device 100 during its manufacture. Other software applications include a message application 138 that can be any suitable software program that allows a user of the portable electronic device 100 to send and receive electronic messages. Various alternatives exist for the message application 138 as is well known to those skilled in the art. Messages that have been sent or received by the user are typically stored in the flash memory 108 of the portable electronic device 100 or some other suitable storage element in the portable electronic device 100. In at least some embodiments, some of the sent and received messages may be stored remotely from the device 100 such as in a data store of an associated host system that the portable electronic device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the portable electronic device 100 is turned off or loses power.

The PIM 142 includes functionality for organizing and managing data items of interest to the user, such as, but not limited to, e-mail, contacts, calendar event records, voice mails, appointments, and task items. A PIM application has the ability to send and receive data items via the wireless network 200. PIM data items may be seamlessly integrated, synchronized, and updated via the wireless network 200 with the portable electronic device subscriber's corresponding data items stored and/or associated with a host computer system. This functionality creates a mirrored host computer on the portable electronic device 100 with respect to such items. This can be particularly advantageous when the host computer system is the portable electronic device subscriber's office computer system.

The portable electronic device 100 also includes a connect module 144, and an IT policy module 146. The connect module 144 implements the communication protocols that are required for the portable electronic device 100 to communicate with the wireless infrastructure and any host system, such as an enterprise system, that the portable electronic device 100 is authorized to interface with. Examples of a wireless infrastructure and an enterprise system are given in FIGS. 3 and 4, which are described in more detail below.

The connect module 144 includes a set of APIs that can be integrated with the portable electronic device 100 to allow the portable electronic device 100 to use any number of services associated with the enterprise system. The connect module 144 allows the portable electronic device 100 to establish an end-to-end secure, authenticated communication pipe with the host system. A subset of applications for which access is provided by the connect module 144 can be used to pass IT policy commands from the host system to the portable electronic device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the portable electronic device 100. The IT policy data can then be stored in the flash memory 106 in its native form. After the IT policy data is stored, a global notification can be sent by the IT policy module 146 to all of the applications residing on the portable electronic device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the portable electronic device 100. These software applications can be third party applications, which are added after the manufacture of the portable electronic device 100. Examples of third party applications include games, calculators, utilities, etc.

The additional applications can be loaded onto the portable electronic device 100 through at least one of the wireless network 200, the auxiliary I/O subsystem 112, the data port 114, the short-range communications subsystem 122, or any other suitable device subsystem 124. This flexibility in application installation increases the functionality of the portable electronic device 100 and may provide enhanced on-device functions, communication-related functions, or both. For example, secure communication applications may enable electronic commerce functions and other such financial transactions to be performed using the portable electronic device 100.

The data port 114 enables a subscriber to set preferences through an external device or software application and extends the capabilities of the portable electronic device 100 by providing for information or software downloads to the portable electronic device 100 other than through a wireless communication network. The alternate download path may, for example, be used to load an encryption key onto the portable electronic device 100 through a direct and thus reliable and trusted connection to provide secure device communication.

The data port 114 can be any suitable port that enables data communication between the portable electronic device 100 and another computing device. The data port 114 can be a serial or a parallel port. In some instances, the data port 114 can be a USB port that includes data lines for data transfer and a supply line that can provide a charging current to charge the battery 130 of the portable electronic device 100.

The short-range communications subsystem 122 provides for communication between the portable electronic device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, optical joystick, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the portable electronic device 100 is substantially similar, except that the received signals are output to the speaker 118, and signals for transmission are generated by the microphone 120. Alternative voice or audio I/O subsystems, such as a voice message recording subsystem, can also be implemented on the portable electronic device 100. Although voice or audio signal output is accomplished primarily through the speaker 118, the display 110 can also be used to provide additional information such as the identity of a calling party, duration of a voice call, or other voice call related information.

Figure 2:
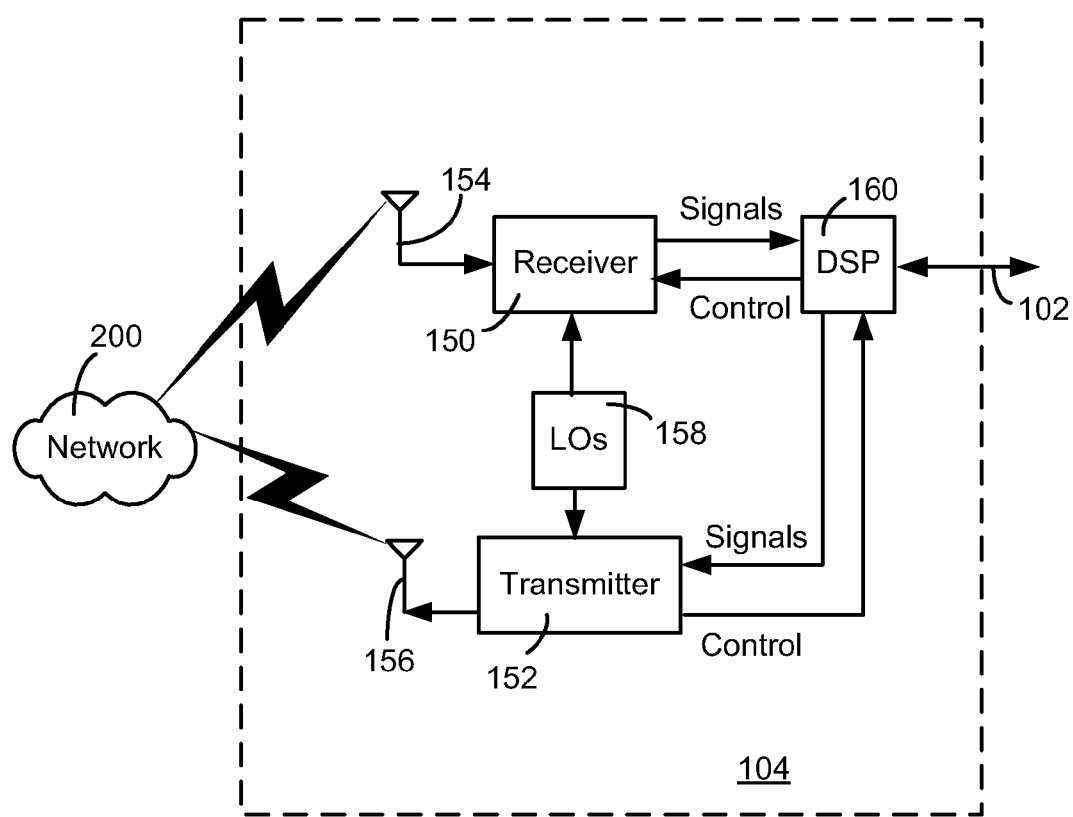
FIG. 2 is a block diagram of an example of an embodiment of a communication subsystem component of the portable electronic device of FIG. 1.

Referring now to FIG. 2, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the portable electronic device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the portable electronic device 100 and the wireless network 200 can contain one or more different channels, typically different RF channels, and associated protocols used between the portable electronic device 100 and the wireless network 200. An RF channel is a limited resource that must be conserved, typically due to limits in overall bandwidth and limited battery power of the portable electronic device 100.

When the portable electronic device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
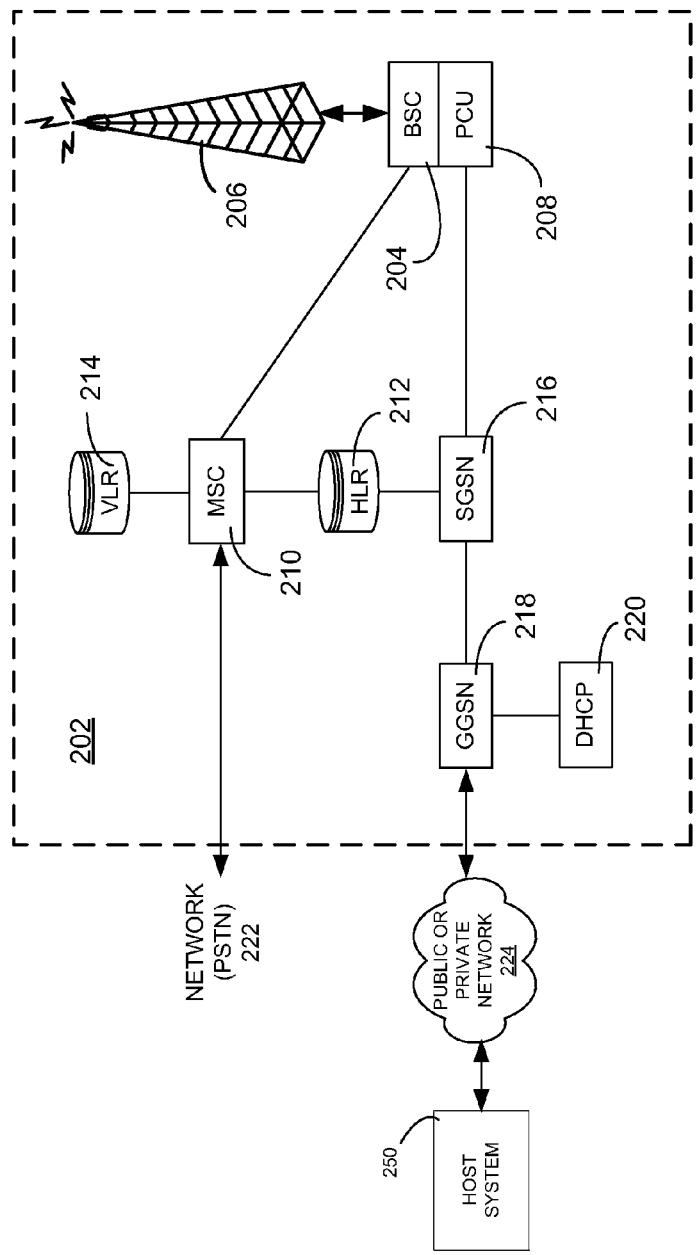
FIG. 3 is a block diagram of an example of a node of a wireless network.

Referring now to FIG. 3, a block diagram of an exemplary implementation of a node 202 of the wireless network 200 is shown. In practice, the wireless network 200 comprises one or more nodes 202. In conjunction with the connect module 144, the portable electronic device 100 can communicate with the node 202 within the wireless network 200. In the exemplary implementation of FIG. 3, the node 202 is configured in accordance with General Packet Radio Service (GPRS) and Global Systems for Portable electronic (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable portable electronic devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the portable electronic device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from portable electronic devices within its cell via the station 206. The fixed transceiver equipment normally performs such functions as modulation and possibly encoding and/or encryption of signals to be transmitted to the portable electronic device 100 in accordance with particular, usually predetermined, communication protocols and parameters, under control of its controller. The fixed transceiver equipment similarly demodulates and possibly decodes and decrypts, if necessary, any communication signals received from the portable electronic device 100 within its cell. Communication protocols and parameters may vary between different nodes. For example, one node may employ a different modulation scheme and operate at different frequencies than other nodes.

For all portable electronic devices 100 registered with a specific network, permanent configuration data such as a user profile is stored in the HLR 212. The HLR 212 also contains location information for each registered portable electronic device and can be queried to determine the current location of a portable electronic device. The MSC 210 is responsible for a group of location areas and stores the data of the portable electronic devices currently in its area of responsibility in the VLR 214. Further, the VLR 214 also contains information on portable electronic devices that are visiting other networks. The information in the VLR 214 includes part of the permanent portable electronic device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each portable electronic device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given portable electronic device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a portable electronic device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each portable electronic device 100 must be assigned to one or more APNs and portable electronic devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a portable electronic device 100 is not using its PDP Context, the PDP Context can be de-allocated and the IP address returned to the IP address pool managed by the DHCP server 220.

Figure 4:
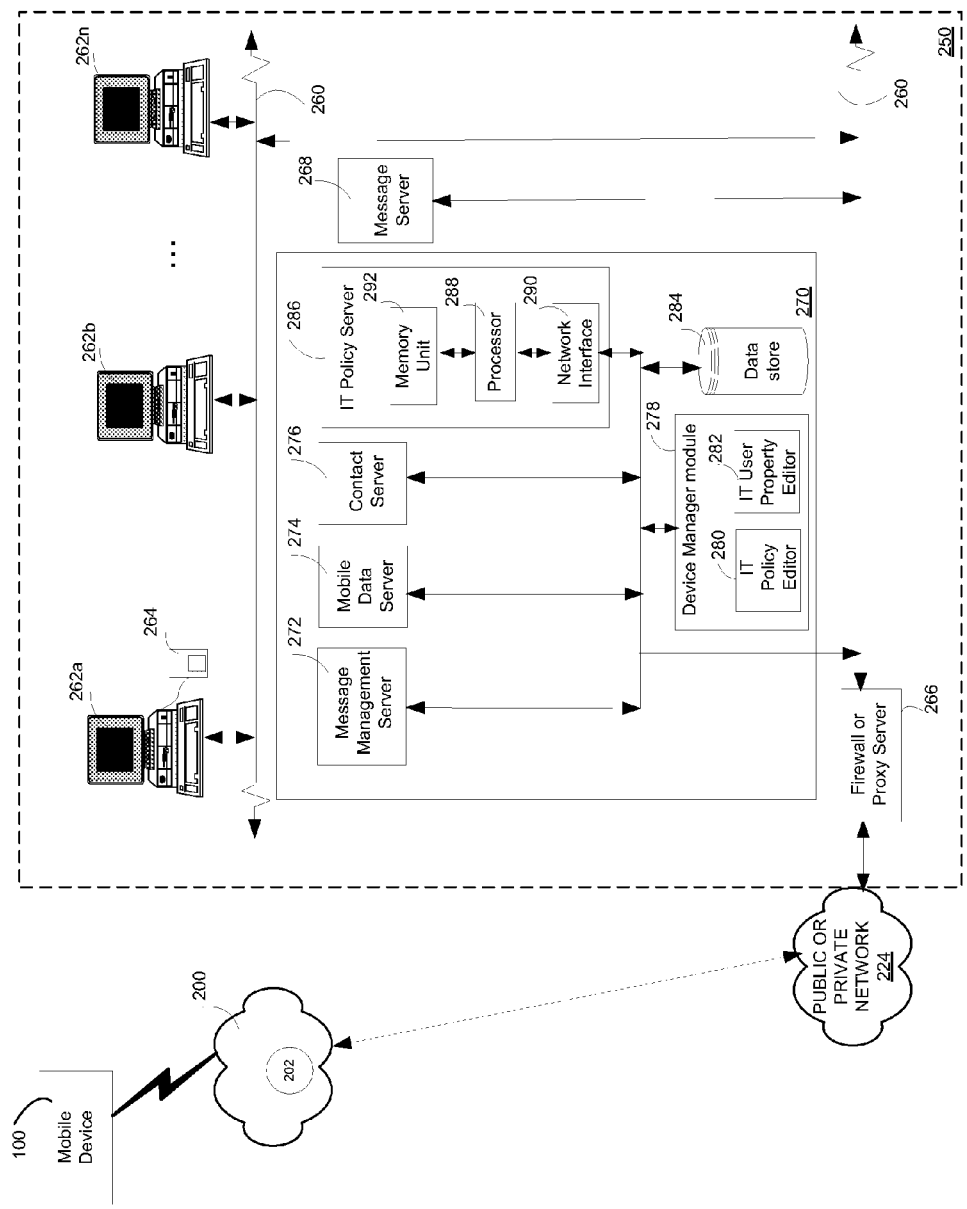
FIG. 4 is a block diagram illustrating components of a host system in one example of a configuration for use with the wireless network of FIG. 3 and the portable electronic device of FIG. 1.

Referring now to FIG. 4, shown therein is a block diagram illustrating components of an exemplary configuration of a host system 250 that the portable electronic device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the portable electronic device 100 belongs. Typically, a plurality of portable electronic devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's portable electronic device 100 is situated on a LAN connection. The cradle 264 for the portable electronic device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the portable electronic device 100, and may be particularly useful for bulk information updates often performed in initializing the portable electronic device 100 for use. The information downloaded to the portable electronic device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

To facilitate the operation of the portable electronic device 100 and the wireless communication of messages and message-related data between the portable electronic device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the portable electronic devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the portable electronic devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the portable electronic device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the portable electronic device 100. The wireless VPN router allows a VPN connection to be established directly through a specific wireless network to the portable electronic device 100. The wireless VPN router can be used with the Internet Protocol (IP) Version 6 (IPV6) and IP-based wireless networks. This protocol can provide enough IP addresses so that each portable electronic device has a dedicated IP address, making it possible to push information to a portable electronic device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the portable electronic device 100 in this alternative implementation.

Messages intended for a user of the portable electronic device 100 are initially received by a message server 268 of the host system 250. Such messages may originate from any number of sources. For instance, a message may have been sent by a sender from the computer 262b within the host system 250, from a different portable electronic device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the portable electronic device 100. Alternatively, the data store associated with the message server 268 can store all of the messages for the user of the portable electronic device 100 and only a smaller number of messages can be stored on the portable electronic device 100 to conserve memory. For instance, the most recent messages (i.e. those received in the past two to three months for example) can be stored on the portable electronic device 100.

When operating the portable electronic device 100, the user may wish to have e-mail messages retrieved for delivery to the portable electronic device 100. The message application 138 operating on the portable electronic device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the portable electronic device 100 is assigned its own e-mail address, and messages addressed specifically to the portable electronic device 100 are automatically redirected to the portable electronic device 100 as they are received by the message server 268.

The message management server 272 can be used to specifically provide support for the management of messages, such as e-mail messages, that are to be handled by portable electronic devices. Generally, while messages are still stored on the message server 268, the message management server 272 can be used to control when, if, and how messages are sent to the portable electronic device 100. The message management server 272 also facilitates the handling of messages composed on the portable electronic device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's portable electronic device 100. The message management server 272 may also compress and encrypt new messages (e.g. using an encryption technique such as Data Encryption Standard (DES), Triple DES, or Advanced Encryption Standard (AES)) and push them to the portable electronic device 100 via the shared network infrastructure 224 and the wireless network 200. The message management server 272 may also receive messages composed on the portable electronic device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the portable electronic device 100 can be defined (e.g. by an administrator in accordance with IT policy) and enforced by the message management server 272. These may include whether the portable electronic device 100 may receive encrypted and/or signed messages, minimum encryption key sizes, whether outgoing messages must be encrypted and/or signed, and whether copies of all secure messages sent from the portable electronic device 100 are to be sent to a pre-defined copy address, for example.

The message management server 272 may also be adapted to provide other control functions, such as only pushing certain message information or pre-defined portions (e.g. "blocks") of a message stored on the message server 268 to the portable electronic device 100. For example, in some cases, when a message is initially retrieved by the portable electronic device 100 from the message server 268, the message management server 272 may push only the first part of a message to the portable electronic device 100, with the part being of a pre-defined size (e.g. 2 KB). The user can then request that more of the message be delivered in similar-sized blocks by the message management server 272 to the portable electronic device 100, possibly up to a maximum pre-defined message size. Accordingly, the message management server 272 facilitates better control over the type of data and the amount of data that is communicated to the portable electronic device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the portable electronic device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of portable electronic devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the portable electronic devices 100. As mentioned, the IT administrator can use IT policy rules to define behaviors of certain applications on the portable electronic device 100 that are permitted such as phone, web browser or Instant Messenger use. The IT policy rules can also be used to set specific values for configuration settings that an organization requires on the portable electronic devices 100 such as auto signature text, WLAN/VoIP/VPN configuration, security requirements (e.g. encryption algorithms, password rules, etc.), specifying themes or applications that are allowed to run on the portable electronic device 100, and the like.

Figure 5:
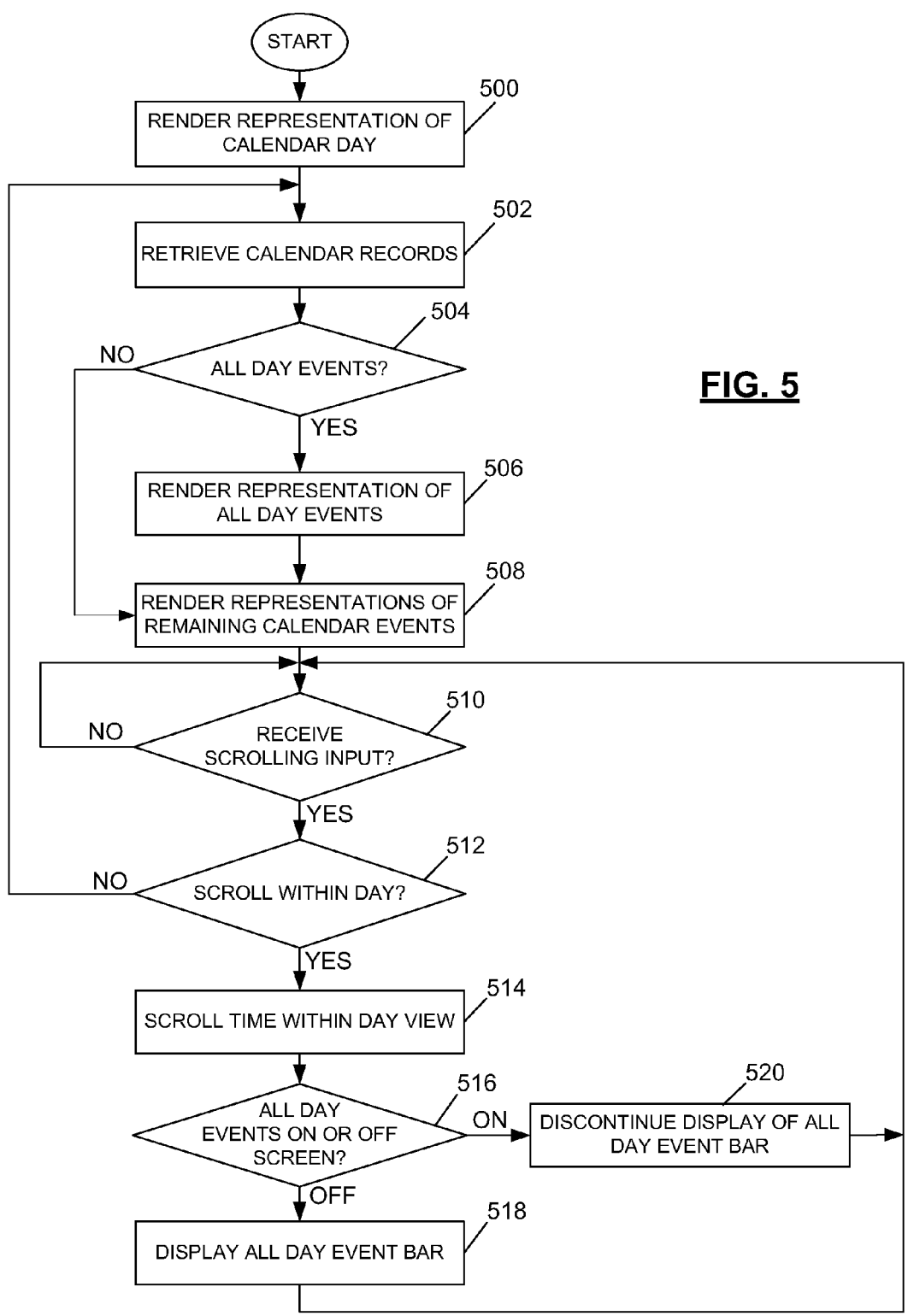
FIG. 5 is a flow chart illustrating an example of a method of controlling an electronic device for rendering calendar information.

Reference is now made to FIG. 5 which shows a flowchart illustrating a method of controlling an electronic device, such as the portable electronic device 100 to render calendar information. The method may be carried out by software executed, for example, by the processor 102. Coding of software for carrying out such a method is within the scope of a person of ordinary skill in the art given the present description. The method can include additional or fewer processes than shown and described, and may be performed in a different order.

In general, the method includes rendering a representation of a day in a calendar day view on a display of an electronic device, retrieving calendar event records that satisfy constraints, identifying a first all-day event record and a second all-day event record of the calendar event records, and in response to identifying the first all-day event record and the second all-day event record, maintaining display of an all-day event indicator in the day view during scrolling within the representation of the day by alternately displaying an indicator of the first all-day event record and an indicator of the second all-day event record.

The calendar application is utilized for providing a graphical user interface (GUI) for the user to create calendar event records and for storage of the calendar event records in a database in the memory 108, which is a persistent storage device such as a flash memory. The calendar application is also utilized for displaying representations of calendar event records such as appointments, lectures, exams, movies, meetings, performances, dinners, ceremonies, etc. Each calendar event record includes a variety of information including a start date and time and an end date and time of the event. Rather than a start and end time, a calendar event record may be stored as an all-day record. All-day records can include, for example, birthdays, anniversaries, and all-day events such as conferences or extended meetings. A calendar event record is stored as an all-day calendar event record when, for example, an all-day event option is selected during creation of the calendar event record. Alternatively, the calendar event record can be stored as an all-day calendar event record when the start date and time and end date and time are equivalent to the start date and time and end date and time, respectively, of the calendar day.

Calendar event records are displayed in a calendar view, which can be a day view, a week view, a month view, or an agenda view. The day view provides a view of a calendar day showing time slots with calendar event records for calendar events that have a start time or end time or both start and end times in the day represented in the calendar day view. Representations of calendar event records are rendered at appropriate time slots in the calendar day view based on the start and end times. Other information can be provided in the representations of the calendar event records such as subject or title information and location to facilitate quick identification of the calendar event records in the list.

A scrolling input can be received from the auxiliary I/O subsystem 112. For example, a scrolling input may be received when a trackball is rolled, when a finger is moved along the surface of an optical joystick, when a finger is moved along a surface of a touch-sensitive overlay on the display 110, when a finger is moved along a surface of a track pad, or any other suitable scrolling input method. When scrolling input is received, the direction of the scrolling input is determined.

When the representation of the day is rendered in the calendar day view, scrolling can be effected to scroll through time within the representation of the day, thereby scrolling forward in time or back, depending on the scrolling direction. Optionally, scrolling can be effected to scroll to a representation of a new day. For example, scrolling can be effected to scroll to a day that is later or a day that is earlier compared to the current day represented in the day view, depending on the scrolling direction. The scrolling can include line scrolling in which a line or multiple lines appear to exit one side of the view and a new line or lines enter at the opposing side of the view. Alternatively, the scrolling may be page scrolling by selection of a page scrolling button or feature.

The method starts when the calendar application is executed and the calendar day view is rendered on the display 110 of the portable electronic device 100 at 500. The calendar day view may be a default view when the calendar application is executed or may be selected by selection of a day view option in a calendar GUI. The day view is rendered with time listed in a column such that representations of calendar event records can be listed, adjacent to the time column, based on the start time and end time for each calendar event records for the represented day. The calendar event record is represented such that the start time is adjacent the corresponding time in the time column and the end time is adjacent the corresponding time in the time column. The length of the representation of the calendar event record is therefore dependent on the duration of the calendar event.

Calendar event records are retrieved at 502. All calendared event records that meet specified constraints are retrieved from the database in which the calendar event records are stored in the memory 108. The constraints include, for example, a time span. All calendar event records that have a start date and time or an end date and time or both a start date and time and an end date and time that fall within a time span related to the current day, are retrieved. For example, the time span can include the current day according to an internal clock, the day before the current day, and the two days after the current day.

When one or more of the calendar event records retrieved at 502 is an all-day event for the represented day, as determined at 504, the method proceeds to 506. A representation of each all-day event is rendered at 506. The representation of each all-day event can be rendered in any suitable location on the display 110 such as, for example, near the top of the representation of the day in the day view. The representation of each all-day event can be rendered in a bar, above the list of times in the calendar day view. When none of the calendar event records retrieved at 502 are all-day events for the represented day, as determined at 504, the method continues at 508. The remaining calendar event records retrieved at 502 that fall within the represented day, are determined and representations of those remaining calendar event records that fall within the represented day are rendered in the day view at 508.

When a scrolling input is received at 510, the direction of scrolling is determined. When, based on the direction, the scrolling is within the representation of the day, as determined at 512, the time within the day view is scrolled forward or backward at 514, based on the direction of scrolling. When one or more of the all-day events are scrolled off the screen, an all-day event bar is rendered at 518. The all-day event bar can be rendered in any suitable location on the display 110 such as, for example, near the top of the representation of the day in the day view. A representation of the all-day event record is maintained on the display 110 as scrolling does not effect the location of display of the all-day event bar. When, based on the direction, the scrolling results in display of a representation of another day at 512, display of the all-day event bar, if any is displayed, is discontinued and the process continues at 502 where additional calendar events may be retrieved. When, for example, after scrolling or as a result of scrolling, the all-day event or events as rendered at 506 are displayed on the screen at 516, the all-day event bar is not displayed and display of the all-day event bar, if any is displayed, is discontinued 520. The method continues at 510 where scrolling may continue. When scrolling through the times in the representation of the day, an indicator of an all-day event is maintained as representations of the all-day event or events are displayed.

Figure 6:
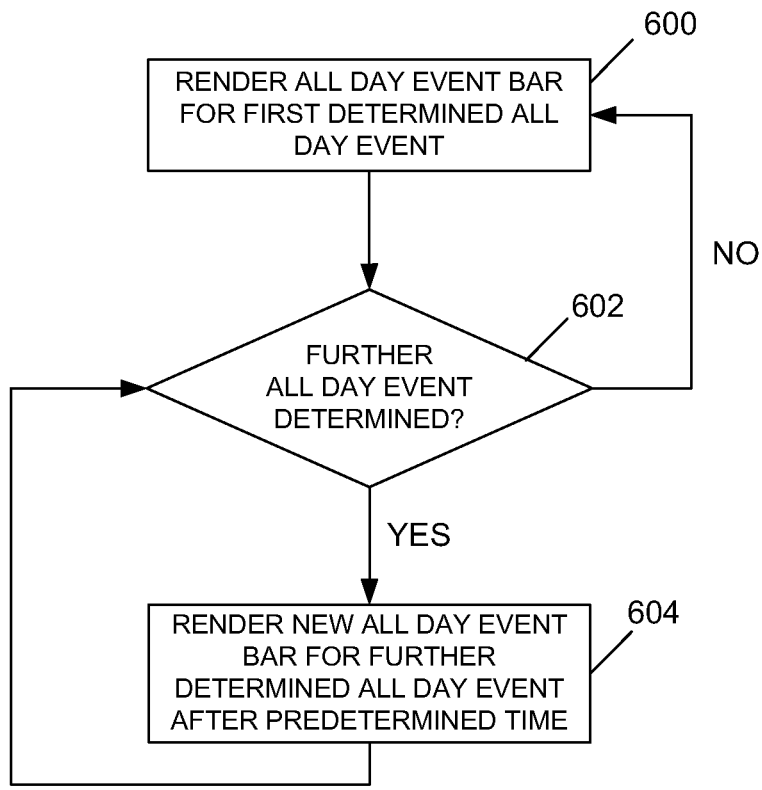
FIG. 6 is a flow chart illustrating sub steps of the method of controlling an electronic device for rendering calendar information of FIG. 5.

Referring to FIG. 6, which shows a flowchart illustrating substeps in rendering the all-day event bar at 516. When one or more of the calendar event records retrieved at 502 is an all-day event, and is scrolled off the screen as determined at 516, an all-day event bar is rendered 518 and a representation of the first determined all-day event is displayed at 600. The representation of the first all-day event in the all-day event bar is a further representation of the first all-day event, further to the representation rendered at 506. When more than one of the calendar event records retrieved at 502 is an all-day event, as determined at 602, a further representation of the next all-day event is displayed at 604. The further all-day event is only displayed after displaying the previous all-day event for a predetermined time period, such as 1, 2, or 3 seconds. When only one of the calendar event records retrieved at 502 is an all-day event, as determined at 602, the display of the representation of the first all-day event is maintained on the display 110 and scrolling does not effect the location of the display of the representation.

Referring to FIG. 7A through 7D, example screen shots of a portable electronic device 100 according to the method of FIG. 5 and FIG. 6 are illustrated. In the examples of FIG. 7A through 7D, the portable electronic device 100 includes the keyboard 116 and an optical joystick 702, also referred to as an input device, for controlling, for example, highlighting on the display 110. The remainder of the features of the portable electronic device 100 may be similar to those described above with reference to FIG. 1. A touch may be detected by the optical joystick 402 and processed by the processor, for example, to determine attributes of the touch including the touch location. Movement of the touch may also be detected by the optical joystick 402 for controlling movement of the highlighting or other indicator on the display 110.

Figure 7A:
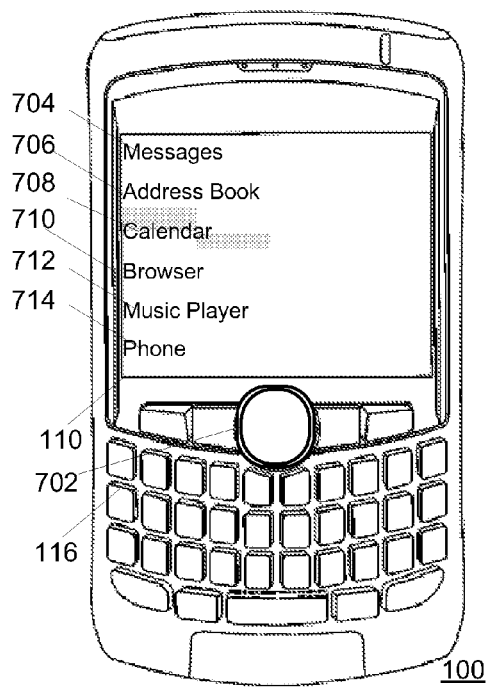
FIGS. 7A, 7B, 7C, and 7D illustrate examples of screen shots of an electronic device in the method of FIG. 6.

The portable electronic device 100 is utilized for displaying selectable features including representations of applications, as shown in the electronic device illustrated in the FIG. 7A. The representations shown in the example of FIG. 7A include a "Messages" representation 704, an "Address Book" representation 706, a "Calendar" representation 708, a "Browser" representation 710, a "Music Player" representation 712, and a "Phone" representation 714, each associated with a respective application.

Figure 7B:
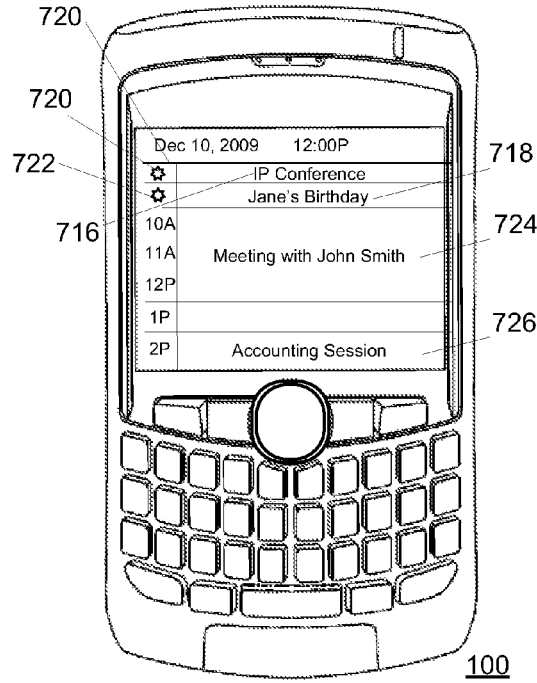

Selection of the calendar application by, for example, scrolling to highlight the "Calendar" representation 708, followed by depression of the optical joystick 702, is illustrated FIG. 7A. For the purpose of the present example, the day view is the default view when the calendar application is executed and the representation of the day is rendered in the day view on the portable electronic device 100 at 500, as shown in FIG. 7B. All calendared event records that meet specified constraints are retrieved from the database in which the calendar event records are stored. The calendar event records that are retrieved include two all-day events entitled "IP Conference", "Jane's Birthday", and two meetings entitled "Meeting with John Smith" and "Accounting Session".

A determination is made at 504 that two of the calendar event records are all-day calendar events and representations of the "IP Conference" calendar event 716 and the "Jane's Birthday" 718 are rendered at 506. The representations of the "IP Conference" calendar event 716 and "Jane's Birthday" 718 are each rendered in separate bars above the list of times in the orientation of the portable electronic device 100 shown in FIG. 7B. In the present example, two stars 720 and 722 are rendered in the time column 720 to indicate that the events are all-day event. The all-day events are therefore easily identified in an at-a-glance view.

The remaining calendar event records retrieved at 502 that fall within the represented day, including the "Meeting with John Smith" calendar event record 724 and "Accounting Session" calendar event record 726 are determined and representations of those remaining calendar event records that fall within the represented day are rendered in the day view at 508.

Figure 7C:
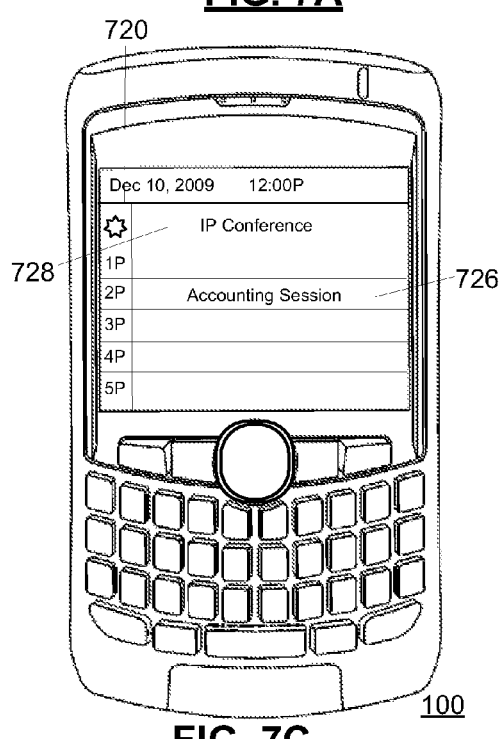
Figure 7D:
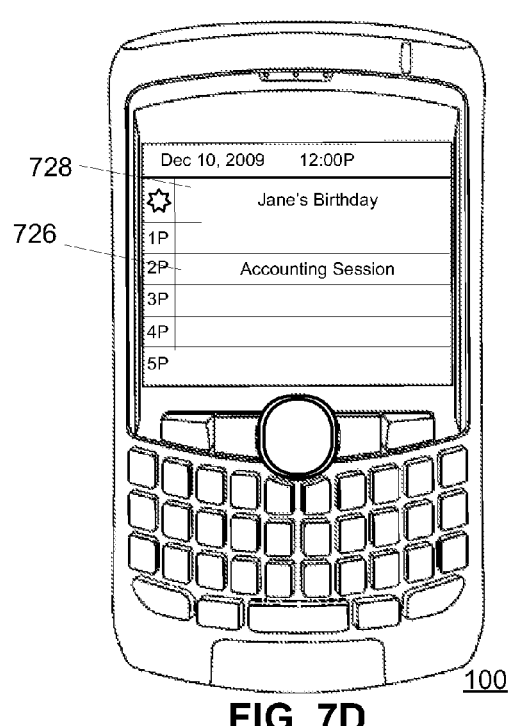

A scrolling input is received at 510 and the direction of scrolling is determined to be upwardly in the orientation shown in FIG. 7C. The scrolling is within the representation of the day, as determined at 512. The time within the day view is scrolled forward at 514 and the representation of the "Meeting with John Smith" calendar event record 724 is scrolled off the display 110. The all-day event "IP Conference" and the all-day event "Jane's Birthday" are scrolled off the screen at 516 and an all-day event bar is rendered at 518. In this example, the calendar event records retrieved at 502 include two all-day events. When the all-day event bar is rendered at 518, a first one of the all-day events, "IP Conference", is displayed at 600 on the display 110 at the position 728. After a predetermined time period, a representation of the second all-day event, "Jane's Birthday", is displayed at 604 in the all-day event bar at the position 728 on the display, as shown in FIG. 7D. In the present example, the further representation of the all-day events "IP Conference" and "Jane's Birthday" displayed at 600 are similar to the representations rendered at 502. The further representation of the all-day events "IP Conference" and "Jane's Birthday" may, however, have different attributes and may appear dissimilar to the representations rendered at 502.

Referring to FIG. 8A through 8D, example screen shots of another electronic device 800 according to the method of FIG. 5 and FIG. 6 are illustrated. In the examples of FIG. 8A through 8D, the portable electronic device 100 includes a touch-sensitive display 802, for controlling, for example, highlighting on the display 110.

The touch-sensitive display 802 in the present example is a capacitive touch-sensitive display, although other suitable touch-sensitive displays may be utilized, such as a resistive, infrared, surface acoustic wave (SAW) touch-sensitive display, strain gauge, optical imaging, dispersive signal technology, as known in the art. A capacitive touch-sensitive display includes a capacitive touch-sensitive overlay that acts as the input device. The overlay is be an assembly of multiple layers in a stack including, for example, a substrate, a ground shield layer, a barrier layer, one or more capacitive touch sensor layers separated by a substrate or other barrier, and a cover. The capacitive touch sensor layers are any suitable material, such as patterned indium tin oxide (ITO).

One or more touches, also known as touch contacts or touch events, can be detected by the touch-sensitive display 118. The processor 102 determines attributes of the touch, including a location of a touch. Touch location data may include an area of contact or a single point of contact, such as a point at or near a center of the area of contact. A signal is provided to a controller, which is connected to the processor, in response to detection of a touch. Multiple simultaneous touches can be detected and movement of the touch can be detected. Many of the remaining features of the portable electronic device 700 may be similar to those described above with reference to FIG. 1.

Figure 8A:
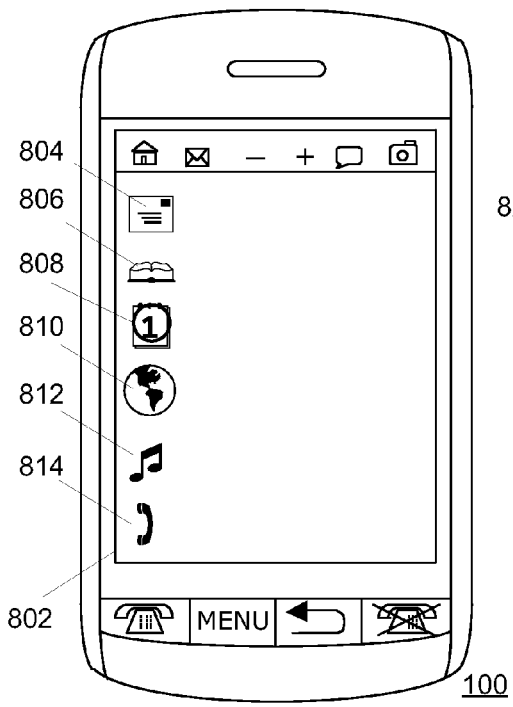
FIGS. 8A, 8B, 8C, and 8D illustrate examples of screen shots of another electronic device in the method of FIG. 6.
Figure 8B:
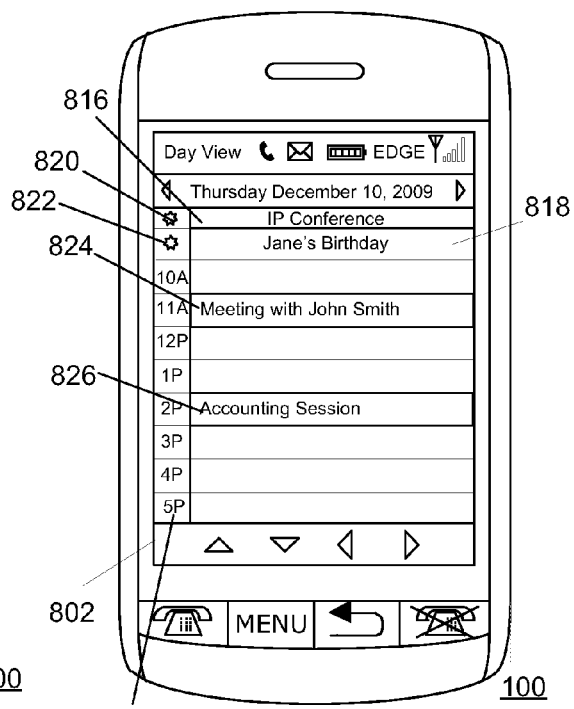
Figure 8C:
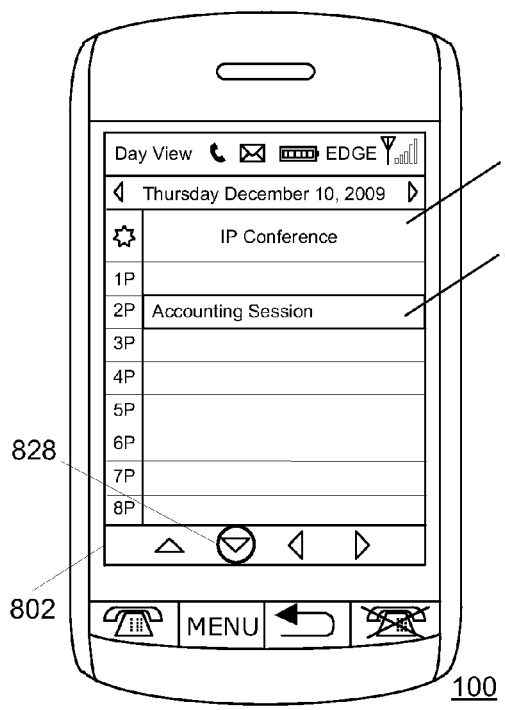

The portable electronic device 800 is utilized for displaying selectable features including representations of applications, as shown in FIG. 8A. The representations shown in the example of FIG. 8A include a message icon 804, an address book icon 806, a calendar icon 808, a browser icon 810, a music player icon 812, and a phone icon 814, each associated with a respective application.

The calendar application is executed in response to selection of the calendar application by, for example, a tap, or touch of short duration, on the calendar icon 808 on the touch-sensitive display 802. For the purpose of the present example, the day view is the default view when the calendar application is executed and the representation of the day is rendered on the portable electronic device 800 at 500. All calendared event records that meet specified constraints are retrieved from the database in which the calendar event records are stored. The calendar event records that are retrieved include an all-day event entitled "IP Conference" and two meetings entitled "Meeting with John Smith" and "Accounting Session".

A determination is made at 504 that one of the calendar event records is an all-day calendar event and a representation of the "IP Conference" calendar event 816 and "Jane's Birthday" calendar event 818 record are rendered at 506. The representations of the "IP Conference" calendar event 816 and the "Jane's Birthday" calendar event record 818 are rendered in a bar above the list of times in the orientation of the portable electronic device 800 shown in FIG. 8B. In the present example, stars 820 and 822 are rendered in the time column to indicate that the events are all-day events. The all-day events are therefore easily identified in an at-a-glance view.

The remaining calendar event records retrieved at 502 that fall within the represented day, including the "Meeting with John Smith" calendar event record 824 and "Accounting Session" calendar event record 826 are rendered in the day view at 508.

Figure 8D:
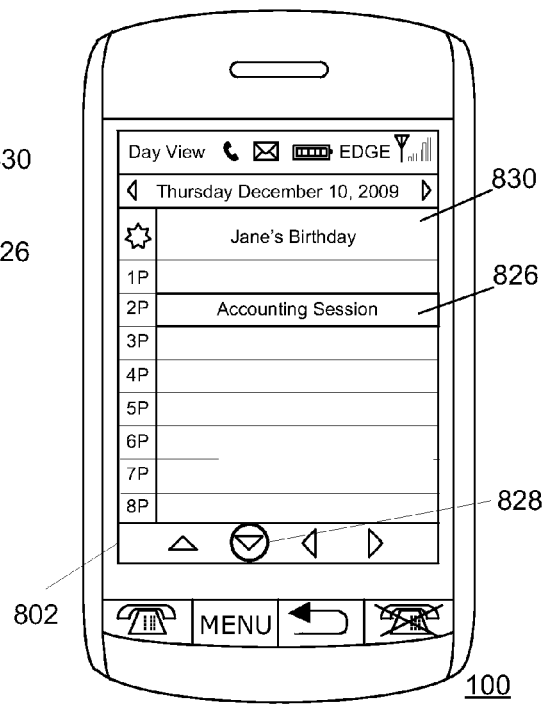

A scrolling input is received at 510 and the direction of scrolling is determined. The scrolling input is received from selection of a page scrolling button rendered on the touch-sensitive display 802 as shown by the touch 828 illustrated by the circle in FIG. 8C. Alternatively, scrolling may be effected by a gesture on the touch-sensitive display 800. A gesture is a particular type of touch in which the location on the display 800 changes. The scrolling is within the representation of the day, as determined at 512 and the time within the day view is scrolled forward at 514. During scrolling, the representation of the "Meeting with John Smith" calendar event record 820 and the representation of the "Jane's Birthday" calendar event record 822 are scrolled off the display 118, as determined at 516. An all-day event bar is rendered 518. Referring now to FIG. 6, a representation of the first of the all-day events, "IP Conference", is displayed at 600 in the all-day event bar on the display 110 at the position 830. The representation of the first all-day event in the all-day event bar is a further representation of the first all-day event, further to the representation rendered at 506. After a predetermined time period, a further representation the second one of the all-day events, "Jane's Birthday", is displayed at 604 in the all-day event bar at the position 830 on the display, as shown in FIG. 8D. In the present example, the further representation of the all-day events "IP Conference" and "Jane's Birthday" displayed at 600 are similar to the representations rendered at 502. The further representation of the all-day events "IP Conference" and "Jane's Birthday" may, however, have different attributes and may appear dissimilar to the representations rendered at 502.

If the user scrolls back such that the all-day events as rendered at 506 are displayed on the screen again, as determined at 516, display of the all-day event bar is discontinued.

According to an aspect, a method is provided. The method includes rendering a representation of a day in a calendar day view on a display of an electronic device, retrieving calendar event records that satisfy constraints, identifying a first all-day event record and a second all-day event record of the calendar event records, and in response to identifying the first all-day event record and the second all-day event record, maintaining display of an all-day event indicator in the day view during scrolling within the representation of the day by alternately displaying an indicator of the first all-day event record and an indicator of the second all-day event record.

According to another aspect, a computer-readable medium is provided. The computer-readable medium includes computer-readable code executable by at least one processor of a portable electronic device to perform the above method.

According to another aspect, an electronic device includes a display, an input device, a memory, and a processor operably coupled to the display, the input device, and the memory to execute a program stored in memory to render a representation of a day in a calendar day view on a display of an electronic device, retrieve calendar event records that satisfy constraints, identify a first all-day event record and a second all-day event record of the calendar event records, and in response to identifying the first all-day event record and the second all-day event record, maintain display of an all-day event indicator in the day view during scrolling within the representation of the day by alternately displaying an indicator of the first all-day event record and an indicator of the second all-day event record.

The control of the electronic device to render the all-day event and maintain the display of the all-day event during scrolling facilitates scrolling to display information in a day view without additional scrolling to view all-day events that may conflict. The all-day event is maintained on the display, near the top of the day view, during scrolling through the time within the representation of the day. Scrolling in one direction, for example, to view representations of calendar event records followed by scrolling in a reverse direction to view a representation of an all-day event or events is unnecessary, decreasing electronic device use time and decreasing power consumption.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   rendering a representation of a day in a calendar day view on a display of an electronic device;
   retrieving calendar event records that satisfy constraints;
   displaying, in the representation of the day rendered in the calendar day view, a first time slot containing a first all-day event record and a second time slot containing a second all-day event record of the calendar event records;
   in response to detection of a scrolling operation within the calendar day view that causes the first time slot and the second time slot to be scrolled off the display, displaying a single all-day time slot that alternately displays an indicator of the first all-day event record, and after a predetermined time period, an indicator of the second all-day event record.

2. The method according to claim 1, wherein the indicator of the first all-day event record comprises a further representation of the first all-day event record and the indicator of the second all-day event record comprises a further representation of the second all-day event record.

3. The method according to claim 2, comprising discontinuing display of the further representation of the first all-day event record and the further representation of the second all-day event record when the first representation of the first all-day event record is scrolled onto the display.

4. The method according to claim 2, wherein the further representation of the first all-day event record and the further representation of the second all-day event record comprises an all-day event bar.

5. The method according to claim 2, wherein displaying the further representation of the first all-day event record comprises displaying the further representation of the first all-day event record for a predetermined period of time before displaying the further representation of the second all-day event record.

6. The method according to claim 5, wherein displaying the further representation of the second all-day event record comprises displaying the further representation of the second all-day event record for a predetermined period of time before repeating displaying the further representation of the first all-day event record.

7. The method according to claim 2, comprising discontinuing display of the single all-day time slot upon receipt of an input to change the day view to represent another day.

8. The method according to claim 2, wherein displaying the single all-day time slot comprises alternately rendering the further representation of the first all-day event record and the further representation of the second all-day event record near a top of the day view.

9. The method according to claim 1, wherein displaying the single all-day time slot comprises displaying the single all-day time slot at a top of the day view during scrolling within the representation of the day.

10. The method according to claim 1, wherein the scrolling operation within the calendar day view comprises one of line scrolling and page scrolling.

11. The method according to claim 1, comprising rendering representations of other calendar event records.

12. The method according to claim 1, wherein displaying the single all-day time slot comprises maintaining a location of the single all-day time slot during scrolling.

13. A non-transitory computer-readable medium having computer-readable code stored therein executable by at least one processor of a portable electronic device to perform a method comprising:
   rendering a representation of a day in a calendar day view on a display of an electronic device;
   retrieving calendar event records that satisfy constraints;
   displaying, in the representation of the day rendered in the calendar day view, a first time slot containing a first all-day event record and a second time slot containing a second all-day event record of the calendar event records;
   in response to detection of a scrolling operation within the calendar day view that causes the first time slot and the second time slot to be scrolled off the display, displaying a single all-day time slot that alternately displays an indicator of the first all-day event record, and after a predetermined time period, an indicator of the second all-day event record.

14. An electronic device comprising:
   a display;
   a input device;
   a memory; and
   a processor in communication with the display, the input device, and the memory to execute a program stored in memory to:
   render a representation of a day in a calendar day view on a display of an electronic device;
   retrieve calendar event records that satisfy constraints;
   display, in the representation of the day rendered in the calendar day view, a first time slot containing a first all-day event record and a second time slot containing a second all-day event record of the calendar event records; and
   in response to detection of a scrolling operation within the calendar day view that causes the first time slot and the second time slot to be scrolled off the display, display a single all-day time slot that alternately displays an indicator of the first all-day event record, and after a predetermined time period, an indicator of the second all-day event record.

15. The electronic device according to claim 14, wherein the indicator of the first all-day event record comprises a further representation of the first all-day event record and the indicator of the second all-day event record comprises a further representation of the second all-day event record.

16. The electronic device according to claim 14, wherein the single all-day time slot is displayed at a top of the day view during scrolling within the representation of the day.

17. The electronic device according to claim 14, wherein a location of the single all-day time slot is maintained during scrolling.

* * * * *